Patented June 22, 1943

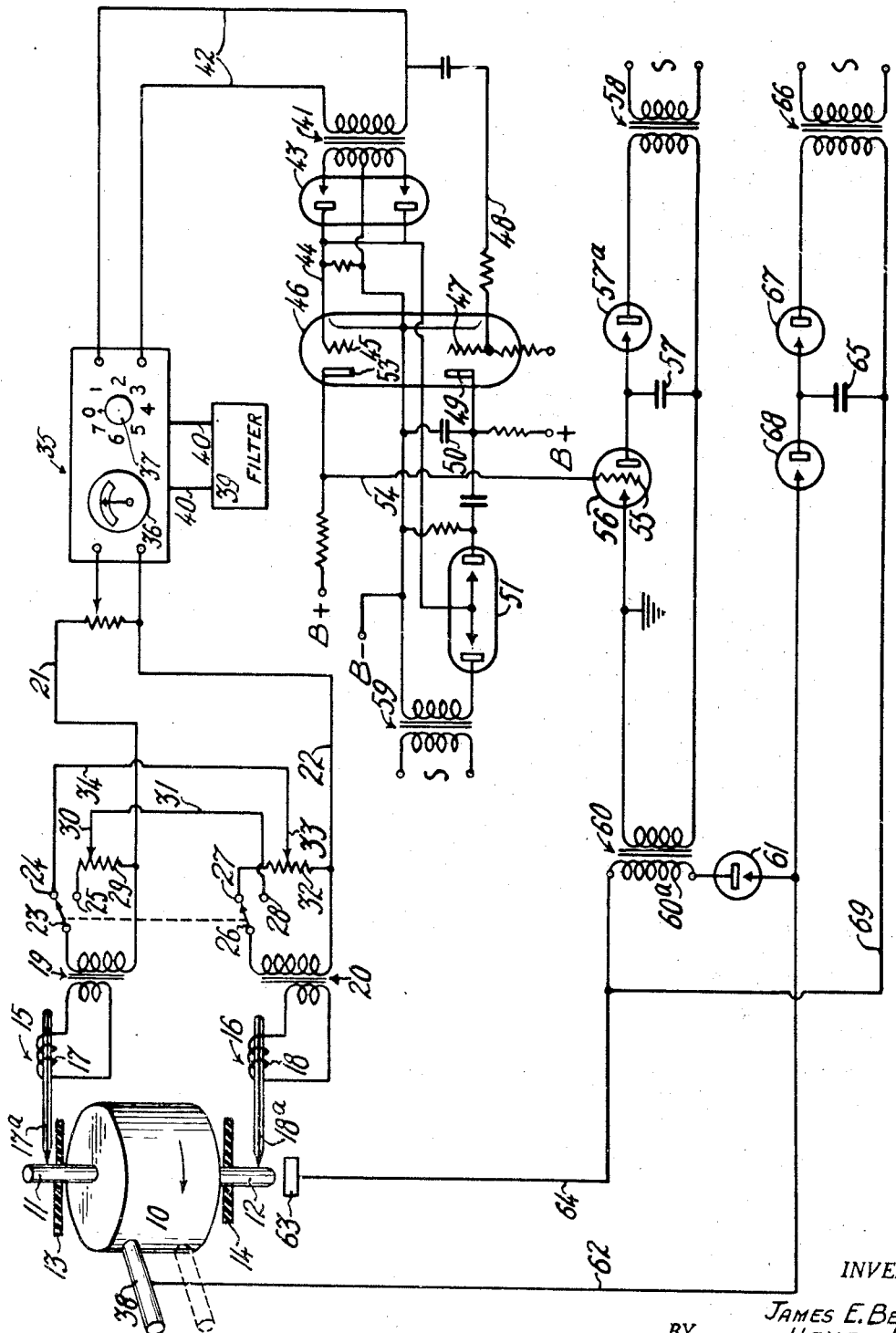

2,322,561

UNITED STATES PATENT OFFICE 2,322,561

AUTOMATIC BALANCING OF ROTATING BODIES

James E. Bevins, Ardmore, Pa., and Henry Konet, Ridgefield Park, N. J., assignors to Bendix Aviation Corporation, Bendix, N. J., a corporation of Delaware Application March 25, 1942, Serial No. 436,208

9 Claims. (Cl. 219—15)

This invention relates generally to the balancing of rotors, and more particularly to a novel method of and apparatus for automatically balancing gryroscopic rotors or the like.

Methods and apparatus heretofore provided in the art, for balancing unbalanced rotors consisted in mounting the rotor for rotation upon a preferably flexible support, bringing the rotor up to speed, determining in various ways, such as by marking, the location of the rotor masses causing the unbalance, and, there after, stopping the rotor and drilling it at the designated location to thereby remove the mass or masses causing the unbalance. The marking and drilling operation was repeated until the rotor became substantially balanced. This was a cumbersome and time consuming procedure as it entailed stopping the rotor for drilling and again bringing the rotor up to speed. Furthermore, careful and exact drilling was required.

An object of the present invention, therefore, is to overcome the foregoing disadvantages and to provide a novel method for balancing unbalanced rotors in which the step necessitating the stopping of the rotor and subsequent drilling thereof has been done away with.

Another object of the invention is to provide a novel method of balancing unbalanced rotors by automatically determining the location of the undesirable mass or masses on the rotor causing the unbalance and simultaneously burning off the material at that location until such time as the rotor becomes balanced.

A further object of the invention is to provide a novel method of rotor balancing without the use of any mechanism to drill or touch the rotor, thus resulting in a precision not obtainable heretofore during rotation.

Another object of the invention is to provide novel apparatus for carrying out the foregoing novel method of rotor balancing.

A further object of the invention is to provide a novel apparatus for providing either static or dynamic balance of unbalanced rotors by automatically burning off metal from the rotor at the point of unbalance.

Another and further object of the invention is to provide a novel apparatus for balancing rotors consisting of a spark circuit interlocked with a power arc circuit whereby impulses are generated in the spark circuit in accordance with the vibration of the rotor spin axis due to unbalanced masses so as to provide an ionized path, to the rotor at the point of unbalance, for the power arc which is simultaneously generated with the spark to burn the rotor at the point of unbalance.

The above and further objects and novel features of the invention will more fully appear from the following detailed description when the same is read in connection with the accompanying drawings in which the single figure represents diagrammatically a suitable form of the novel apparatus for carrying out the novel method of the present invention. It is to be expressly understood, however, that the drawing is for the purpose of illustration only and is not intended as a definition of the limits of the invention.

In the following detailed description the body to be tested is illustrated as a gyro rotor, but it will be obvious that any type of rotor or rotating means other than a gyro rotor, may be balanced by the novel method and apparatus of the present invention.

As illustrated in the drawing, the body to be balanced comprises a rotor 10 having trunnions 11 and 12 mounted within suitable and flexible supports 13 and 14, which permit of substantial vibration on the part of the trunnions therein, the amount of vibration being a function of the magnitude of the unbalanced masses present within the rotor.

Associated with each of the trunnions 11 and 12 are vibration responsive devices generally designated by reference characters 15 and 16. Such devices are well known in the art and may comprise as shown, electromagnetic coils 17 and 18, each of which has cooperating therewith movable magnetic members 17a and 18a contacting trunnions 11 and 12, respectively, and generating in coils 17 and 18 periodic electrical impulses, whose amounts are a function of the magnitude and speed of vibration of each of the trunnions. If desired, the vibration responsive means may comprise diaphragm type microphones with rods contacting each of the trunnions so as to vibrate the diaphragms which, in turn, generate periodic impulses in coils 17 and 18 in accordance with their vibrations.

The total vibration of each trunnion is determined not only by the presence of an unbalanced mass at the related rotor end but also by the presence of an unbalanced mass at the opposite rotor end so that the separate voltages developed by each of coils 17 and 18 are determined by the masses present at both rotor ends. Furthermore, the effect produced upon one trunnion because of the presence of an unbalanced mass at a related rotor end is opposite to the effect produced by the same mass upon the other trunnion so that when a positive impulse is generated in one of the coils 17 or 18, a second and a negative impulse is generated simultaneously in the other of the coils.

If the unbalanced mass were located at a point on the outer rotor periphery contained within a transverse central plane perpendicular to the spin axis, both trunnions would vibrate an equal amount and in the same direction. The latter is recognized as static unbalance and the former as dynamic unbalance.

In addition, should the unbalancing mass be located only at the top end of the rotor, trunnion 11 would vibrate a greater amount than lower trunnion 12 but the phase of vibration of one trunnion would be opposite to the phase of vibration of the other trunnion.

In order to properly ascertain the amount of the separate unbalanced masses acting at or near each of the rotor ends, a mixing and plane selecting circuit is provided. Such circuit comprises transformers 19 and 20, the primary of the former having a voltage impressed thereon in accordance with the output of vibration responsive device 15 and the primary of the latter having a voltage impressed thereon in accordance with the output of device 16.

One side of the secondary of transformer 19 is connected with an outlet lead 21, while an outlet lead 22 connects with one side of the secondary of transformer 20. The free end of the secondary of transformer 19 is provided with a selector switch 23 adapted for selective engagement with either of two terminals 24 and 25, and the free end of the secondary of transformer 20 is provided with a similar selector switch 26 adapted for selective engagement with either of two terminals 27 and 28. The upper and lower portions of the mixing and plane selecting circuit are further provided with two potentiometers, one comprising a resistor 29 connected across terminal 25 and lead 21 and a slidably adjustable contact element 30 therefor connected by way of lead 31 to terminal 28, and the other comprising a resistor 32 connected across terminal 27 and lead 22, and a slidably adjustable contact element 33 therefor connected by way of lead 34 to terminal 24. Selector switches 23 and 26 are arranged to operate in unison for a purpose to presently appear.

Since the voltages generated by each of the devices 15 and 16 are small, a suitable and conventional amplifier is provided within a casing 35 for their amplification, outlet leads 21, 22 of the mixing and plane selecting circuit being connected to the input of the amplifier. The amplified output may be observed upon a voltmeter 36 in conjunction with an attenuator device 37. The purpose of the attenuator device is to reduce the voltage supplied to the voltmeter in case of a relatively large output of the vibration responsive devices and to increase the voltage at the voltmeter in case of a small output at the vibration responsive devices, together with maintaining a constant potential to the control circuit to be hereinafter described.

The initial adjustment of the mixing and plane selecting circuit is accomplished by mounting within flexible supports 13, 14, a previously balanced rotor, providing it with an unbalancing mass at its top end, for example, and bringing the rotor up to speed. At this point, potentiometer contact elements 30 and 33 are in a position adjacent outlet leads 21 and 22 wherein the resistors 29 and 32 have been cut out of the circuit. Selector switches 23 and 26 are adjusted to the position shown in the drawing wherein switch 23 engages terminal 24 and switch 26 engages terminal 27. At this position, resistor 32 is in parallel with the secondary of transformer 20 while voltages in the secondary of the transformer 19 flow by way of leads 21 to one side of the amplifier input and by way of switch 23, terminal 24, lead 34, contact 33 and lead 22 to the other side of the amplifier input.

The output voltage of device 15 is impressed upon leads 21 and 22 and the amount thereof as registered upon voltmeter 26 is indicative of the magnitude of the unbalancing mass at the top end of the rotor. The voltmeter reading is noted and selector switches 23 and 26 are moved to their second position, that is, one in which switch 23 engages terminal 25 and switch 26 engages terminal 28.

The voltage at the amplifier output now is that generated in the secondary of transformer 20 due to the vibration of the lower trunnion and the reading of the voltmeter will indicate the voltage output to be less than that previously due to the output of vibration responsive device 15. The circuit in this latter case is determined through lead 22 from one side of the secondary of transformer 20, and through switch 26, terminal 28, lead 31, contact element 30 and lead 21 to the other side of the amplifier input.

By adjusting contact element 30 relative to resistor 29, the reading due to the output of device 16 on voltmeter 36 is brought down to zero which means that, with the presence of a second unbalancing mass near the bottom of the rotor, the effective output of device 16 as registered on the voltmeter will be that due only to the added unbalance near the bottom of the rotor without the effect normally resulting from the presence of the unbalancing mass at the top of the rotor.

In order to adjust the plane selecting circuit for unbalances present near the bottom of the rotor, the rotor is stopped and the mass removed from the top and imposed on the rotor at or near its opposite end. At this point, selector switches 23 and 26 remain in their second position and the output of device 16 is noted on the voltmeter. The switches are subsequently moved to their first position and the output of device 15 as registered on the voltmeter is found to be smaller than that of the output of device 16. Contact 33 is adjusted relative to resistor 32 until the voltmeter registers zero for the output of device 15.

The mixing and plane selecting circuit has thus been adjusted so that the indicated output of device 15 will be only that due to the unbalancing masses in a plane at or near the top end of the rotor, and that of device 16 due only to the presence of unbalancing masses in a plane at or near the bottom end of the rotor. By operation of selector switches 23 and 26, the plane having the greater unbalance may be determined by observation of the voltmeter and adjustment of the attenuator device and it remains to locate the position of rotor unbalance.

In order to locate the position of rotor unbalance and properly adjust a spark discharge at that position, the previously balanced rotor is again considered. An unbalancing mass is again imposed at the top end of the rotor, for example, and a suitable electrode 38 is moved toward the top end of the rotor to the full line position shown in the drawing. Sparking will result in a manner to presently appear, and a mark or burn is made on the rotor. The rotor is stopped and if the mark appears at a position other than the location of the imposed mass, the electrode is adjusted in an angular path about the rotor to a position to correspond with the position of the imposed mass to thereby time the spark discharge at the moment the location of unbalance passes the electrode and the entire apparatus is now in a condition for testing and balancing all rotors of the same size and type.

Since there are causes, other than rotor unbalance, which set up vibrations of the trunnions, as that due to bearings and windage, they must be compensated for and as their frequency is different from the fundamental rotor frequency they may be filtered out by means of a conventional filter device, generally designated at 39, which is connected by way of leads 40 to the amplifier input.

A rotor to be tested is now mounted within the flexible supports 13 and 14 and brought up to speed. Selector switches 23 and 26 are operated to determine the plane in which the greater unbalance is apparent and electrode 38 is adjusted accordingly. If, for example, the greater unbalance is at or near the top end of the rotor, the output of vibration responsive device 15 is amplified and flows to the primary of a transformer 41 by way of leads 42. The secondary of this transformer connects with a suitable rectifier tube, generally designated at 43, and the amplifier output is rectified into a full wave pulsating D. C. current which, by way of lead 44, is impressed upon the grid 45 of a tube 46, the lower section of which is provided with another grid 47. A portion of the output voltage of the amplifier is also led by way of a conductor 48 to grid 47 and the output voltage is additionally amplified, passing through a related anode 49 and because of a phasing condenser 50 associated with the plate circuit of grid 47, the voltage is phase shifted relative to the phase of the full wave D. C. impressed on grid 45. The phased voltage, furthermore, is half-wave rectified at the right hand section of a second rectifier tube 51 and impressed by way of a lead 52 to suppress the voltage at grid 45 whereby the resulting voltage at that grid resolves itself into one having one firing peak for each cycle where it formerly had two such firing peaks during each cycle.

A plate 53 of the upper section of tube 46 connects by way of a conductor 54 with the control grid 55 of a conventional thyratron tube 56 to control the ionization or firing thereof. Associated with the thyratron is a charging condenser 57 connected through a rectifier 57a with the secondary of a transformer 58 whose primary, in turn, is connected across a suitable supply source such as a 110 volt, 60 cycle line. The output voltage of device 15 has a considerably greater frequency than the frequency of the voltage charging condenser 57 and, unless some adjustment is provided, tube 56 will fire each time the voltage at grid 45 passes through its firing peak thus preventing proper charging of condenser 57. Furthermore, unless some means is provided to suppress the firing peaks of the voltage at grid 45, errors will be introduced in the operation of rotor balancing by virtue of additional vibrations resulting from the discharge from electrode 38 to the rotor. In suppressing the firing peaks of the voltage at grid 45, the additional rotor vibration due to spark discharge is dissipated.

In order to provide proper compensation for these latter conditions, the left section of rectifier tube 51 is connected with the secondary of a transformer 59, whose primary, in turn, is preferably connected across the same supply line as that which charges condenser 57. This voltage is half-wave rectified at the left-hand section of tube 51 and impressed upon the voltage at grid 45 thereby timing and suppressing the firing peaks of the voltage at that grid in such a manner that it is maintained sufficiently high so that the voltage at plate 53 and, therefore, control grid 55, is decreased, permitting full charging of condenser 57. When the half wave rectified supply voltage across grid 45 reaches its lowest value, plate 53 becomes sufficiently positive so that the rectified vibration voltage at grid 45 can cause a further positive impulse at plate 53 to reach the firing potential at grid 55 of tube 56, the latter becomes fully conductive, discharging condenser 57 through a transformer 60, whose secondary 60a is a high voltage spark coil, rectifier 61, lead 62, electrode 38, rotor 10, return electrode 63, and lead 64. The high voltage spark, thus generated by condenser discharge, provides an ionized path between electrode 38 and the rotor for a purpose to presently appear. By reason of its function, the circuit containing tube 56, condenser 57 and transformer 60 may be termed a "spark circuit."

In order to burn off undesirable material from the rotor, a power arc of relatively high current and low voltage is provided in a novel manner. Such an arc, of itself, would not traverse the gap between the electrode and the rotor, hence the purpose of providing an ionized path by spark discharge for the power arc. For this purpose a second and heavier circuit, termed a "power arc circuit" is connected in a novel manner with the spark circuit and timed to charge and discharge with the latter circuit.

A suitable condenser 65 is connected through a rectifier 67 with the secondary of a transformer 66 whose primary is connected across a suitable supply source which, preferably, is the source supply of transformers 58 and 59. The side of condenser 65 connected with rectifier 67, connects with lead 62 and electrode 38 through a rectifier 68, the latter being arranged in opposition to rectifier 61. This arrangement of rectifiers 61 and 68 prevents the discharge of the spark of spark coil 60a of transformer 60 through condenser 65, but the latter condenser will discharge through rectifier 68 when condenser 57 is discharged. The opposite side of condenser 65 connects by way of lead 69 with lead 64 so that the spark circuit and the power arc circuit are interlocked in such a manner that condenser 65 is timed to charge and discharge simultaneously with condenser 57.

The timing and interlocking of the power arc circuit with the spark circuit is so provided that condenser 65 is prevented from discharging through a circuit determined by rectifiers 68 and 61, spark coil 60a and lead 69 to the other side of the condenser because of the opposition of rectifiers 61 and 68. Furthermore, the power arc generated by discharge of condenser 65 being of relatively heavy current and low voltage cannot pass through lead 62 and back to leads 64 and 69 because, as stated before, the power arc, of itself, cannot traverse the gap between the rotor and the electrode. Hence, the power arc circuit will discharge only when the spark circuit discharges for the reason that the spark generated by the discharge of condenser 57 and transformer 60 provides an ionized path from electrode 38 to rotor 10 and the power arc of condenser 65 follows such ionized path to burn the material from the rotor at the point of unbalance until the rotor becomes balanced in the predetermined compensating plane.

When the balancing of the rotor in the predetermined upper plane is accomplished, as evidenced by the zero reading of voltmeter 36, switches 23 and 26 are operated so that the output of device 16 is impressed at the amplifier output and electrode 38 is moved downwardly to the dotted line position of the drawing and the foregoing described operation repeats itself to balance the rotor at its lower end.

It will be understood that the foregoing method of rotor balance may be used as well in balancing rotors which are constructed of some relatively hard alloy provided with metallic inserts of a lower heat of fusion by burning off a portion of the inserts in the above-described manner, rather than the alloy itself, to obtain balance.

It will be obvious to those skilled in the art that a novel method and apparatus have been provided for balancing rotors by means of which the operation has been minimized as to time and wherein the rotor is burned automatically at the location of unbalance. The circuits are so selected that the discharge of both the spark and power arc circuits is timed to take place only when the point of rotor unbalance passes in front of electrode 38. This follows, as previously described, because the electrode has been adjusted initially about the circumference of the rotor to discharge at the point of rotor unbalance determined with the use of the previously balanced rotor provided with the unbalancing mass.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. Apparatus for analyzing the unbalance of a rotatable body including the combination of means rotatably supporting the body to permit substantial vibration thereof under the action of unbalanced masses in the body, a vibration responsive device operatively associated with the body for generating periodic impulses timed in accordance with its vibrations, means dependent on the timing of such impulses for generating a spark at the surface of the body at the point of location of the unbalanced masses, and means connected to and controlled during the operation of said last-named means to burn the sparked surface of the body to compensate for said unbalanced masses.

2. Apparatus for balancing an unbalanced rotatable body including the combination of means rotatably supporting the body to permit substantial vibration thereof under the action of unbalanced masses in the body, a vibration responsive device operatively associated with the body for generating periodic impulses timed in accordance with the vibrations of said body, a spark circuit energized in accordance with the timing of such impulses for generating a spark at the surface of the body at the point of the angular location of the unbalanced masses, and a power arc circuit connected to and controlled by said spark circuit to operate with said spark circuit to burn the sparked surface of the body.

3. Apparatus for analyzing the unbalance of a gyroscopic rotor or the like including the combination of means rotatably supporting the rotor to permit substantial vibration thereof under the action of unbalanced masses in the rotor, a vibration responsive device operatively connected to respond to rotor vibration for generating periodic impulses timed in accordance with the vibrations of said rotor, a relatively high voltage spark circuit energized in accordance with the timing of such impulses for generating a spark at the rotor surface at the point of angular location of the unbalanced masses, and a second circuit adapted for carrying a relatively high current connected with said spark circuit and operative with said spark circuit to provide a power arc at the rotor to burn the sparked rotor surface.

4. Apparatus for analyzing the unbalance of a gyroscopic rotor or the like including the combination of means rotatably supporting the rotor to permit substantial vibration thereof under the action of unbalanced masses in the rotor, a vibration responsive device operatively connected to respond to rotor vibration for generating periodic impulses timed in accordance with the vibrations of said rotor, a sparking electrode arranged adjacent the surface of the rotor and energized for burning the rotor surface at the point of location of the unbalanced masses producing said vibrations, a relatively high voltage spark circuit connected to said electrode and energized in accordance with the timing of said impulses for generating periodic impulses at said electrode timed in accordance with the rotor vibrations, and a power circuit connected with said electrode and said spark circuit to operate with said spark circuit to provide a power arc at said electrode.

5. The method of balancing an unbalanced rotor, comprising mounting and spinning the rotor within a flexible support to permit vibration of the rotor, generating an alternating E. M. F. proportional to the vibration of the rotor, amplifying and full-wave rectifying said generated alternating E. M. F., phase shifting and half-wave rectifying a portion of the amplified generated E. M. F. and impressing it upon the amplified and full-wave rectified E. M. F. to provide an E. M. F. having one firing peak for each frequency cycle, charging a spark condenser and a power arc condenser, impressing a half-wave rectified voltage of a frequency different from the frequency of the generated E. M. F. upon the E. M. F. having one firing peak per frequency cycle to suppress the firing peaks during the charging of said spark and power arc condensers, and discharging said condensers simultaneously when the half-wave rectified voltage approaches its minimum value to burn the rotor surface at the location of unbalance.

6. The method of balancing an unbalanced rotor, comprising mounting and spinning the rotor within a flexible support to permit vibration of the rotor, generating an alternating E. M. F. proportional to the vibration of the rotor, amplifying and full-wave rectifying said generated E. M. F., charging a spark condenser and a power arc condenser, impressing a half-wave rectified voltage whose frequency differs from the frequency of the generated E. M. F. upon the full-wave rectified E. M. F. to suppress its firing peaks during the charging of the spark and power arc condensers, and discharging the condensers simultaneously to burn the rotor surface at the location of unbalance when the half-wave rectified voltage approaches its minimum value.

7. Apparatus for analyzing the unbalance of a rotatable body including the combination of means rotatably supporting the rotor to permit substantial vibration thereof under the action of unbalanced masses in the rotor, a vibration responsive device operatively connected to respond to rotor vibration for generating an alternating E. M. F. in proportion to the vibration of the rotor, means for amplifying and full-wave rectifying said generated E. M. F., means for phase shifting and half-wave rectifying a portion of the generated E. M. F. and impressing it upon said full-wave rectified E. M. F. to provide an E. M. F. having one firing peak per frequency cycle, a firing tube controlled by said last-named E. M. F., a spark condenser and a power arc condenser, means for charging said condensers, a source of voltage having a frequency other than the frequency of said generated E. M. F., timing means for half-wave rectifying said voltage and impressing it upon the E. M. F. having one firing peak per frequency cycle to suppress a predetermined number of said firing peaks whereby said condensers become fully charged, said firing tube being energized when the half-wave rectified voltage approaches a minimum value to discharge said condensers, and an electrode arranged adjacent said rotor energized during discharge of said condensers.

8. Apparatus for balancing an unbalanced rotatable body including the combination of means rotatably supporting the body to permit substantial vibration thereof under the action of unbalanced masses in the body, a vibration responsive device operatively associated with the body for generating periodic impulses timed in accordance with the vibrations of said body, a spark circuit energized in accordance with the timing of said impulses for generating a spark at the surface of the body at the point of the angular location of the unbalanced masses, and a power arc circuit timed and interlocked with said spark circuit to generate a power arc simultaneously with said spark.

9. Apparatus for balancing an unbalanced rotatable body including the combination of means rotatably supporting the body to permit substantial vibration thereof under the action of unbalanced masses in the body, a vibration responsive device operatively associated with the body for generating periodic impulses timed in accordance with vibrations produced solely by an unbalanced mass associated with a predetermined transverse plane in the body, a relatively high voltage circuit energized in accordance with the timing of said impulses for generating a spark at the surface of the body at the point of location of said unbalanced mass, and a relatively high current circuit timed to generate a power arc simultaneously with the spark of said first circuit.

JAMES E. BEVINS.
HENRY KONET.